(12) United States Patent
Alzate et al.

(10) Patent No.: US 9,809,492 B2
(45) Date of Patent: Nov. 7, 2017

(54) SUBSTRATE WITH A PARTIAL METAL MULTILAYER, GLAZING UNIT AND PROCESS

(71) Applicants: SAINT-GOBAIN GLASS FRANCE, Courbevoie (FR); CENTRE NATIONAL DE LA RECHERCHE SCIENTIFIQUE (C.N.R.S.), Paris (FR)

(72) Inventors: Lina Alzate, Paris (FR); Davy Dalmas, Chatou (FR); Etienne Barthel, Bourg la Reine (FR); David Nicolas, Paris (FR); Benoit Georges, Palaiseau (FR)

(73) Assignees: SAINT-GOBAIN GLASS FRANCE, Courbevoie (FR); CENTRE NATIONAL DE LA RECHERCHE SCIENTIFIQUE (C.N.R.S), Paris (FR)

( * ) Notice: Subject to any disclaimer, the term of this patent is extended or adjusted under 35 U.S.C. 154(b) by 226 days.

(21) Appl. No.: 14/646,908

(22) PCT Filed: Nov. 22, 2013

(86) PCT No.: PCT/FR2013/052830
§ 371 (c)(1),
(2) Date: May 22, 2015

(87) PCT Pub. No.: WO2014/080141
PCT Pub. Date: May 30, 2014

(65) Prior Publication Data
US 2015/0321951 A1  Nov. 12, 2015

(30) Foreign Application Priority Data
Nov. 23, 2012 (FR) ..................... 12 61191

(51) Int. Cl.
*C03C 17/36* (2006.01)
*E06B 3/66* (2006.01)

(52) U.S. Cl.
CPC ............ *C03C 17/36* (2013.01); *C03C 17/366* (2013.01); *C03C 17/3613* (2013.01);
(Continued)

(58) Field of Classification Search
CPC ............ C03C 17/3681; C03C 17/3613; C03C 17/3644; C03C 17/3639; Y10T 428/24851; E06B 3/66; E06B 3/6715
See application file for complete search history.

(56) References Cited

U.S. PATENT DOCUMENTS

2003/0148115 A1* 8/2003 Glenn ................. C03C 17/36
428/432
2007/0128449 A1  6/2007 Taylor et al.
(Continued)

FOREIGN PATENT DOCUMENTS

FR  2 942 794    9/2010
WO  00 29346    5/2000
WO  2007 064450  6/2007

OTHER PUBLICATIONS

International Search Report dated Apr. 9, 2014 in PCT/FR13/052830 Filed Nov. 22, 2013.

*Primary Examiner* — Donald J Loney
(74) *Attorney, Agent, or Firm* — Oblon, McClelland, Maier & Neustadt, L.L.P.

(57) ABSTRACT

The invention relates to a substrate (30) coated on one face (31) with a multilayer of thin films (34) comprising at least one metal functional layer (140) based on silver or made of silver and two antireflective coatings (120, 160), the said antireflective coatings each comprising at least one antireflective layer (124, 164), the said functional layer (140) being disposed between the two antireflective coatings (120,
(Continued)

Figure 1:
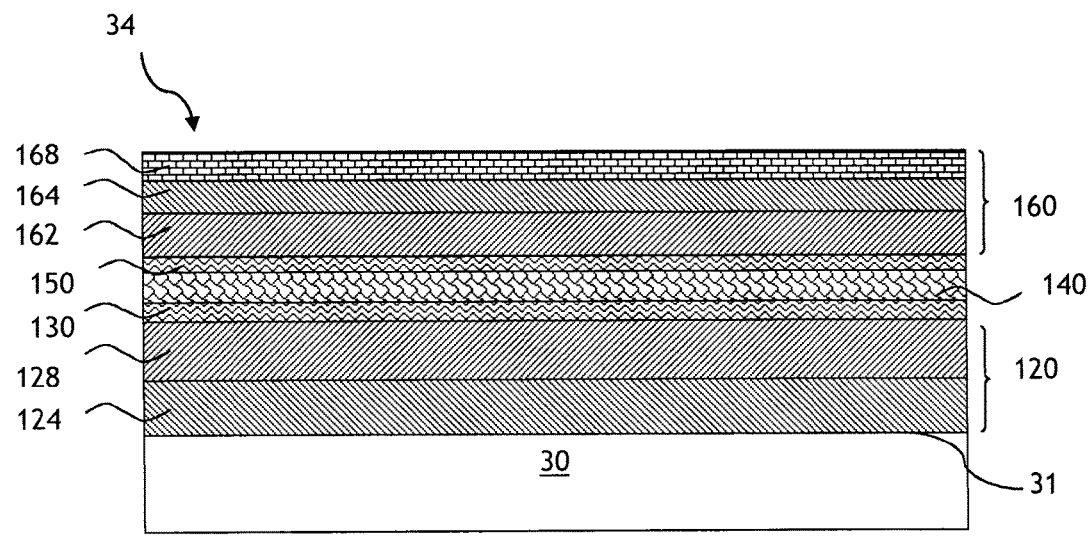

160), characterized in that the said metal functional layer (140) is a discontinuous layer having a surface area occupation factor in the range between 50% and 98%, or even between 53% and 83%.

20 Claims, 9 Drawing Sheets

(52) U.S. Cl.
 CPC ...... *C03C 17/3639* (2013.01); *C03C 17/3644* (2013.01); *C03C 17/3681* (2013.01); *E06B 3/66* (2013.01); *C03C 2217/40* (2013.01); *Y10T 428/24851* (2015.01); *Y10T 428/24868* (2015.01)

(56) References Cited

U.S. PATENT DOCUMENTS

| | | |
|---|---|---|
| 2011/0236715 A1 | 9/2011 | Polcyn et al. |
| 2012/0028009 A1 | 2/2012 | Gerardin et al. |

* cited by examiner

SUBSTRATE WITH A PARTIAL METAL MULTILAYER, GLAZING UNIT AND PROCESS

CROSS-REFERENCE TO RELATED APPLICATIONS

This application is a National Stage of PCT/FR2013/052830 filed on Nov. 22, 2013, and is based upon and claims the benefit of priority to French Application No.1261191filed on Nov. 23, 2012, both of which are incorporated herein by reference in their entireties.

The invention relates to a transparent substrate notably made of a rigid mineral material such as glass, said substrate being coated with a multilayer of thin films comprising one or more functional layers that can act on solar radiation and/or long-wavelength infrared radiation.

The invention more particularly relates to a substrate, notably a transparent glass substrate, having a multilayer of thin films comprising an alternation of "n" metal functional layers, notably functional layers based on silver or on a metal alloy containing silver, and "(n+1)" antireflective coatings, with n an integer number ≥1, in such a manner that the or each functional layer is disposed between two antireflective coatings. Each antireflective coating comprises at least one antireflective layer, each coating being, preferably, composed of a plurality of layers, of which at least one layer, or even each layer, is an antireflective layer. The notion of antireflective layer is here synonymous with that of dielectric layer; the notion of dielectric layer being used especially as opposed to the notion of metal functional layer, which by virtue of its metallic nature cannot be dielectric.

The invention is more particularly related to the use of such substrates for fabricating thermally insulating and/or solar protection glazing units. These glazing units may be designed to equip both buildings and vehicles, with a view notably to decreasing the air conditioning load and/or to preventing excessive overheating (glazing units referred to as "solar control panels") and/or to reducing the quantity of energy dissipated toward the outside (glazing units referred to as "low-emissive panels") driven by the ever-increasing areas of glazed surfaces in buildings and in vehicle passenger compartments.

These substrates may in particular be integrated into electronic devices and the multilayer can then be used as an electrode for the conduction of a current (lighting device, display device, photovoltaic panel, electrochromic glass panels, etc.) or may be integrated into glazing units with particular functionality, such as for example heating glass panels.

One type of multilayer structure known for endowing substrates with such properties is composed of a metal functional layer with reflective properties in the infrared and/or for solar radiation, notably a metal functional layer based on silver or a metal alloy containing silver or completely made of silver.

In this type of multilayer, the functional layer is thus disposed between two dielectric antireflective coatings each comprising, in general, several layers which each consist of an antireflective material of the nitride type and notably silicon or aluminum nitride or oxide.

A barrier coating is however sometimes inserted between a or each antireflective coating and the metal functional layer, the barrier coating disposed under the functional layer in the direction of the substrate protecting it during a possible heat treatment at high temperature, of the forming and/or dip-coating type, and the barrier coating disposed on the functional layer on the opposite side from the substrate protects this layer from a possible degradation during the deposition of the top antireflective coating and during a potential heat treatment at high temperature, of the forming and/or dip-coating type.

Currently, it is generally desired for each metal functional layer to be a complete layer, in other words be composed over the entirety of its surface area and over its whole thickness of the metal material in question.

Those skilled in the art consider that, for a given material (for example silver), under the usual deposition conditions for this material, a complete layer is only obtained beyond a certain thickness.

The adhesion energy between a complete layer of silver and the antireflective layers is very low, of the order of around 1 J/m$^2$, and the adhesion energy between two antireflective layers is five to nine times higher than that between the silver and another layer. The adhesion energy of a multilayer comprising at least one functional layer of silver or based on silver is therefore limited by this low adhesion energy of a complete metal functional layer with the other materials.

The inventors have considered the possibility of depositing multilayers of thin films with one or more metal functional layers and with, for the single metal functional layer or all these metal functional layers when there are several of them, a thickness less than the minimum thickness required in order to obtain a complete layer under the conditions in question.

The inventors have thus observed that, for obvious reasons, the resistance per square of the multilayer was higher than with the same multilayers having one or more complete functional layer(s), but that this resistance per square could nevertheless enable certain applications.

Above all, the inventors have observed that the adhesion energy of the multilayer was then higher than that which the theoretical models predicted.

The inventors then observed that very high mechanical resistances, and even, which is more surprising, very high chemical resistances, could be obtained for multilayers comprising a single metal functional layer, this metal functional layer being discontinuous, and also for multilayers comprising several metal functional layers with all these metal functional layers being discontinuous.

Furthermore, the inventors have observed that the multilayers thus formed were transparent, without haze or surface corrosion, and with colors, both in transmission and in reflection, which could be similar to those obtained with the multilayers having complete metal functional layer(s).

Lastly, the inventors have observed that these excellent properties of mechanical and chemical resistance were conserved even if the substrate coated with the multilayer were subjected to a heat treatment for forming, dip-coating or annealing.

This observation thus opens the way to the use of this type of multilayer for applications for which it is acceptable that a metal functional layer, or each metal functional layer, exhibits a relatively high resistance per square (for example greater than 10 Ω/square) and for which the high adhesion energy, which has a favorable effect on the mechanical resistance, or even sometimes on the chemical resistance, is a big advantage.

In the framework of the example hereinabove, it is then possible to form a multilayer of thin films which indeed exhibits a resistance per square higher than if the, some, or all the functional layers of the multilayer were complete, but which is particularly resistant and can then be used in regions where the climatic conditions impose severe constraints.

The subject of the invention is thus, in its widest sense, a substrate coated on one face with a multilayer of thin films comprising at least one metal functional layer based on silver or made of silver and two antireflective coatings, the said antireflective coatings each comprising at least one antireflective layer, a said functional layer being disposed between the two antireflective coatings; this substrate being noteworthy in that the said (in other words the only metal functional layer of the multilayer when the multilayer comprises a single metal functional layer based on silver or made of silver), or each (in other words all the metal functional layers of the multilayer when the multilayer comprises several metal functional layers based on silver or made of silver) metal functional layer is a discontinuous layer exhibiting a surface area occupation factor in the range between 50% and 98%, or between 53% and 83%, or even between 63% and 83%.

According to the invention, the functional layer thus deposited, or each functional layer thus deposited, is a self-structured layer having a structuring in the form of interconnected islands with uncovered regions between the islands.

As the metal functional layer, when it is the only metal functional layer of the multilayer, or each metal functional layer when there are several metal functional layers in the multilayer, is not continuous, this allows a direct contact to exist between the layers that surround the or each metal functional layer based on silver or made of silver. These regions have a strong adhesion. Any potential crack developed at the weakest interface, hence that between the silver and the adjacent layer, will also need to propagate between the two antireflective layers in order to progress, which requires a higher energy. It is therefore in this way that the overall adhesion energy of the multilayer is considerably improved.

It is important that the multilayer of thin films does not comprise any metal functional layer based on silver or made of silver that is continuous because the presence of at least one such continuous layer reduces the adhesion energy at the two interfaces of this continuous metal functional layer or of each continuous metal functional layer and consequently decreases the resistance properties of the whole of the multilayer by a "weakest link" phenomenon.

In the sense of the present invention, "discontinuous layer" should be understood to mean that, when a square of any given dimensions is considered on the surface of the multilayer according to the invention, then, within this square, the discontinuous functional layer is only present on 50% to 98% of the surface of the square, or on 53% to 83% of the surface of the square, or even on 63% to 83%, respectively.

The square in question is situated within a main part of the coating; in the framework of the invention, the idea is not to form a particular edge or a particular contour which would subsequently be hidden for the final use.

The discontinuity is such that it is possible to measure a finite resistance per square by the usual technique. It is thus a question of obtaining a discontinuous functional layer (or each discontinuous functional layer) for which the clusters of metal material which constitute the layer are separated by volumes of total absence of this material but are connected together.

According to the invention, this type of self-structured multilayer with functional layer(s) has an adhesion energy that is higher with respect to the multilayers with continuous functional layer(s) and their optical properties (light transmission, light reflection and emissivity) are reduced while remaining within acceptable ranges for certain specific applications (mainly for regions with warm or temperate climates) for which a level of emissivity of around 20% to 30% may be suitable.

In the sense of the present invention, "coating" should be understood to mean that there may be only one layer or several layers of different materials inside of the coating.

The term "multilayer" should be understood to mean a set of thin films deposited on top of one another, without interposing a mineral (such as glass) or organic (such as a sheet of plastic material) substrate between these layers.

As is usual, "layer based on a material" should be understood to mean that the layer is predominantly composed of this material, in other words the chemical element of the material, or potentially the product of the material in question in its stable stœchiometric formula, constitutes at least 50%, in atomic percentage of the layer in question.

As is also usual, "antireflective layer" in the sense of the present invention should be understood to mean that, from the point of view of its nature, the material is "non-metallic", in other words is not a metal. In the context of the invention, this term denotes a material having a ratio n/k over the whole visible wavelength range (from 380 nm to 780 nm) equal to or greater than 5.

It is recalled that n denotes the real refractive index of the material at a given wavelength and k represents the imaginary part of the refractive index at a given wavelength; the ratio n/k being calculated at a given wavelength.

The values of refractive index indicated in the present document are the values measured as is usual at the wavelength of 550 nm.

According to the invention, the said, or each discontinuous metal functional layer can have a thickness e:

$1.0 \le e \le 4.5$ nm, or even $1.0 \le e \le 4.0$ nm; or $2.0 \le e \le 4.5$ nm, or even $2.0 \le e \le 4.0$ nm, deposited on a layer based on titanium dioxide $TiO_2$, or $1.0 \le e \le 4.5$ nm, or even $1.0 \le e \le 4.0$ nm; or $2.0 \le e \le 4.5$ nm, or even $2.0 \le e \le 4.0$ nm, deposited on a layer based on zinc and tin oxide $SnZnO_x$, or $1.0 \le e \le 5.0$ nm, or even $1.0 \le e \le 4.5$ nm; or $2.0 \le e \le 5.0$ nm, or even $2.0 \le e \le 4.5$ nm, deposited on a layer based on zinc oxide ZnO, or $1.0 \le e \le 7.0$ nm, or even $1.0 \le e \le 6.0$ nm; or $2.0 \le e \le 7.0$ nm, or even $2.0 \le e \le 6.0$ nm, deposited on a layer based on silicon nitride $Si_3N_4$, or $1.0 \le e \le 5.0$ nm, or even $1.0 \le e \le 4.0$ nm; or $2.0 \le e \le 5.0$ nm, or even $2.0 \le e \le 4.0$ nm, deposited on a layer based on nickel.

Preferably, the multilayer according to the invention is deposited directly onto the face of the substrate.

For a multilayer according to the invention comprising a single discontinuous metal functional layer:

In one particular version of the invention, said antireflective coating disposed between the face and the said metal functional layer comprises a medium index antireflective layer made of a material having a refractive index in the range between 1.8 and 2.2, this medium index antireflective layer preferably being based on oxide. This medium index antireflective layer can have a physical thickness in the range between 5 and 35 nm.

It is furthermore possible for said antireflective coating disposed under the said metal functional layer to comprise a high index antireflective layer made of a material having a refractive index in the range between 2.3 and 2.7, this high index antireflective layer preferably being based on oxide and/or this high index antireflective layer preferably having a physical thickness in the range between 5 and 25 nm.

In another particular version of the invention, said antireflective coating disposed on top of the said metal functional layer on the opposite side from the face comprises a medium index antireflective layer made of a material having a refractive index in the range between 1.8 and 2.2, this medium index antireflective layer preferably being based on oxide. This medium index antireflective layer has, preferably, a physical thickness in the range between 5 and 35 nm.

It is furthermore possible for said antireflective coating disposed on top of the said metal functional layer to comprise a high index antireflective layer made of a material having a refractive index in the range between 2.3 and 2.7, this high index antireflective layer preferably being based on oxide and/or this high index antireflective layer preferably having a physical thickness in the range between 5 and 25 nm. Said multilayer may comprise only two discontinuous metal functional layers based on silver or made of silver and three antireflective coatings, each metal functional layer being disposed between two antireflective coatings.

Said multilayer may comprise only three discontinuous metal functional layers based on silver or made of silver and four antireflective coatings, each discontinuous metal functional layer being disposed between two antireflective coatings.

For a multilayer according to the invention comprising several discontinuous metal functional layers:

In one particular version of the invention, said antireflective coating disposed between the face and the first, or under each, metal functional layer comprises a medium index antireflective layer made of a material having a refractive index in the range between 1.8 and 2.2, this medium index antireflective layer preferably being based on oxide. This medium index antireflective layer can have a physical thickness in the range between 5 and 35 nm.

It is furthermore possible for said antireflective coating disposed under the first, or under each, metal functional layer to comprise a high index antireflective layer made of a material having a refractive index in the range between 2.3 and 2.7, this high index antireflective layer preferably being based on oxide and/or this high index antireflective layer preferably having a physical thickness in the range between 5 and 25 nm.

In another particular version of the invention, said antireflective coating disposed on top of the last, or on top of each, metal functional layer on the opposite side from the face comprises a medium index antireflective layer made of a material having a refractive index in the range between 1.8 and 2.2, this medium index antireflective layer preferably being based on oxide. This medium index antireflective layer has, preferably, a physical thickness in the range between 5 and 35 nm.

It is furthermore possible for said antireflective coating disposed on top of the last, or on top of each, metal functional layer to comprise a high index antireflective layer made of a material having a refractive index in the range between 2.3 and 2.7, this high index antireflective layer preferably being based on oxide and/or this high index antireflective layer preferably having a physical thickness in the range between 5 and 25 nm.

In another particular version of the invention, at least one functional layer is deposited directly onto a barrier undercoat disposed between the functional layer and the antireflective coating underlying the functional layer and/or at least one functional layer is deposited directly under a barrier overcoat disposed between the functional layer and the antireflective coating lying on the functional layer and the barrier undercoat and/or the barrier overcoat comprises a thin layer based on nickel or on titanium having a physical thickness e' such that $0.2\ nm \le e' \le 2.5\ nm$.

The last layer of the overlying antireflective coating, that furthest from the substrate, can be based on oxide, and is then preferably deposited under-stœchiometric; it can notably be based on titanium dioxide ($TiO_x$) or based on a mixed oxide of zinc and tin ($Sn_zZn_yO_x$).

The multilayer may thus comprise a final layer (or "overcoat"), in other words a protective layer, deposited preferably substœchiometric. This layer ends up being oxidized, for the most part stœchiometrically, in the multilayer after the deposition.

The invention furthermore relates to a multiple glazing unit comprising at least two substrates which are held together by a chassis structure, said glazing unit forming a separation between an exterior space and an interior space, in which at least one gas separation interface is disposed between the two substrates, a substrate being according to the invention.

In one particular variant, the multilayer according to the invention is positioned on the face 4 of the glazing unit.

The glazing unit according to the invention incorporates at least the substrate carrying the multilayer according to the invention, eventually associated with at least one other substrate. Each substrate may be clear or colored. Notably, at least one of the substrates can be made of glass colored in the bulk. The choice of the type of coloring will depend on the level of light transmission sought and/or on the colorimetric aspect sought for the glazing unit once it has been manufactured.

The glazing unit according to the invention can have a laminated structure, associating notably at least two rigid substrates of the glass type via at least one thermoplastic polymer sheet, so as to obtain a structure of the glass/multilayer of thin films/sheet(s)/glass/sheet of glass type. The polymer can notably be based on polyvinylbutyral PVB, ethylene vinylacetate EVA, polyethylene terephthalate PET, polyvinyl chloride PVC.

The invention furthermore relates to the use of at least one metal functional layer based on silver or made of silver and two antireflective coatings in order to form a substrate coated with a multilayer of thin films and notably a substrate according to the invention, the said (in other words the only metal functional layer of the multilayer when the multilayer comprises a single metal functional layer based on silver or made of silver), or each (in other words all the metal functional layers of the multilayer when the multilayer comprises several metal functional layers based on silver or made of silver) metal functional layer being a discontinuous layer exhibiting a surface area occupation factor in the range between 50% and 98%, or between 53% and 83%, or even between 63% and 83%.

The invention furthermore relates to a process for depositing at least one metal functional layer based on silver or made of silver and two antireflective coatings in order to form a substrate coated with a multilayer of thin films and notably a substrate according to the invention, the said (in other words the only metal functional layer of the multilayer when the multilayer comprises a single metal functional layer based on silver or made of silver), or each (in other words all the metal functional layers of the multilayer when the multilayer comprises several metal functional layers based on silver or made of silver) metal functional layer being a discontinuous layer exhibiting a surface area occupation factor in the range between 50% and 98%, or between 53% and 83%, or even between 63% and 83%.

Advantageously, the present invention thus allows a multilayer of thin films to be formed with a single functional layer having, when deposited on a transparent substrate, a light transmission in the visible $T_L$>50% and a light reflection in the visible $R_L$ (on the multilayer side) less than 20% with relatively neutral colors in transmission and in reflection, while at the same time exhibiting an emissivity lower than that of the substrate alone.

Advantageously, the present invention thus allows a multilayer of thin films to be formed with 1, 2, 3, 4, or even more, metal functional layer(s) in which all the metal functional layers based on silver or made of silver of the multilayer are discontinuous so that the multilayer exhibits a high mechanical resistance and/or a high chemical resistance.

Figure 2:
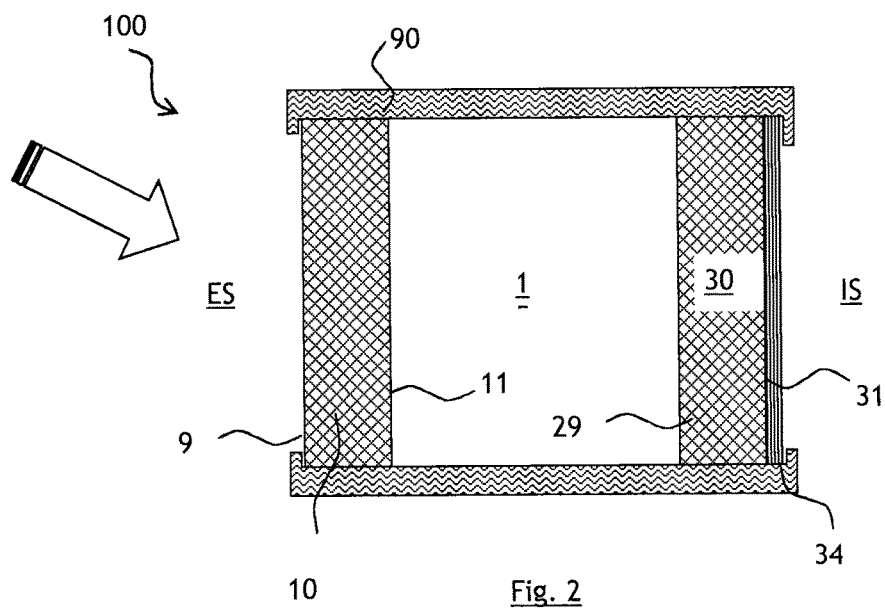
Figure 3:
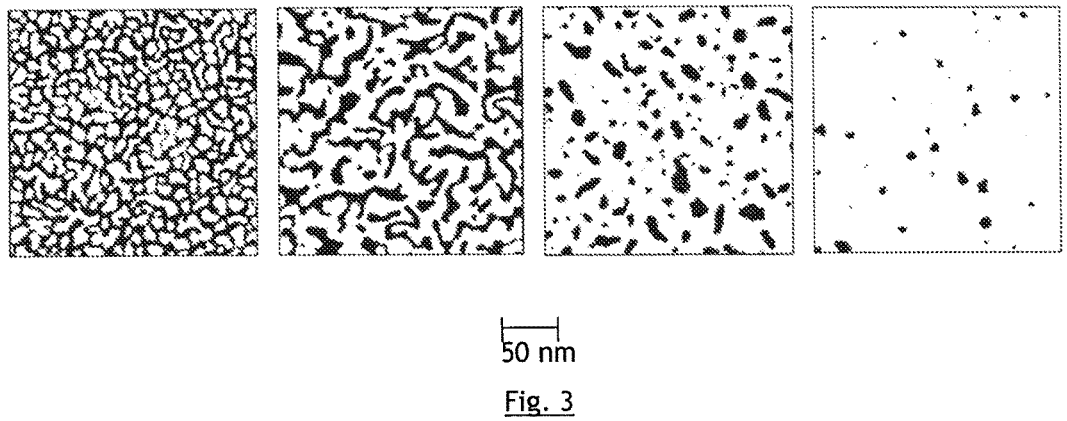
Figure 4:
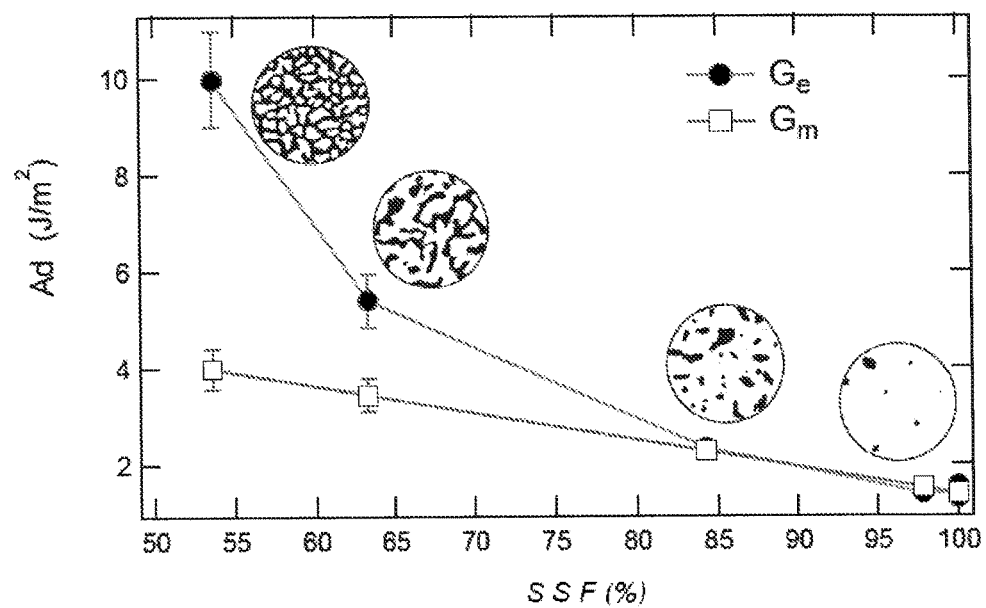
Figure 5:
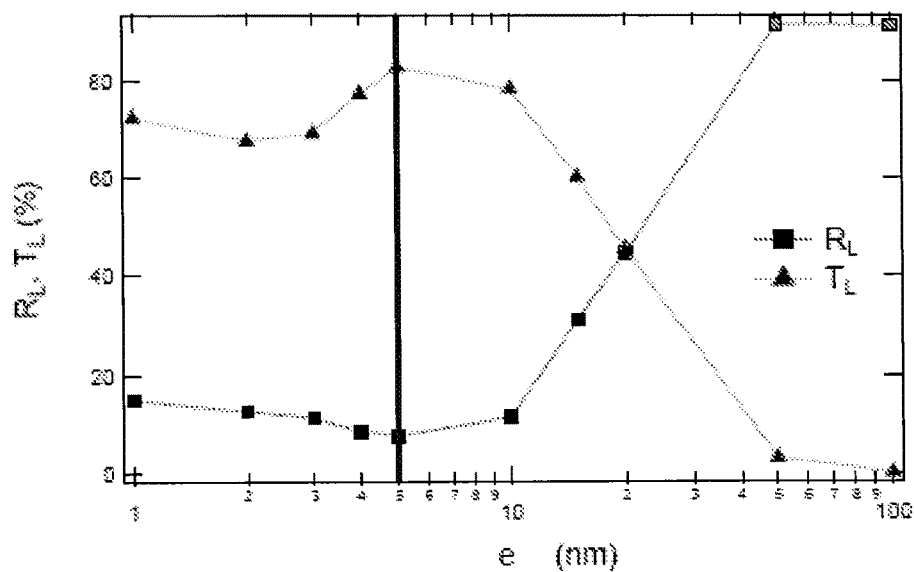
Figure 6:
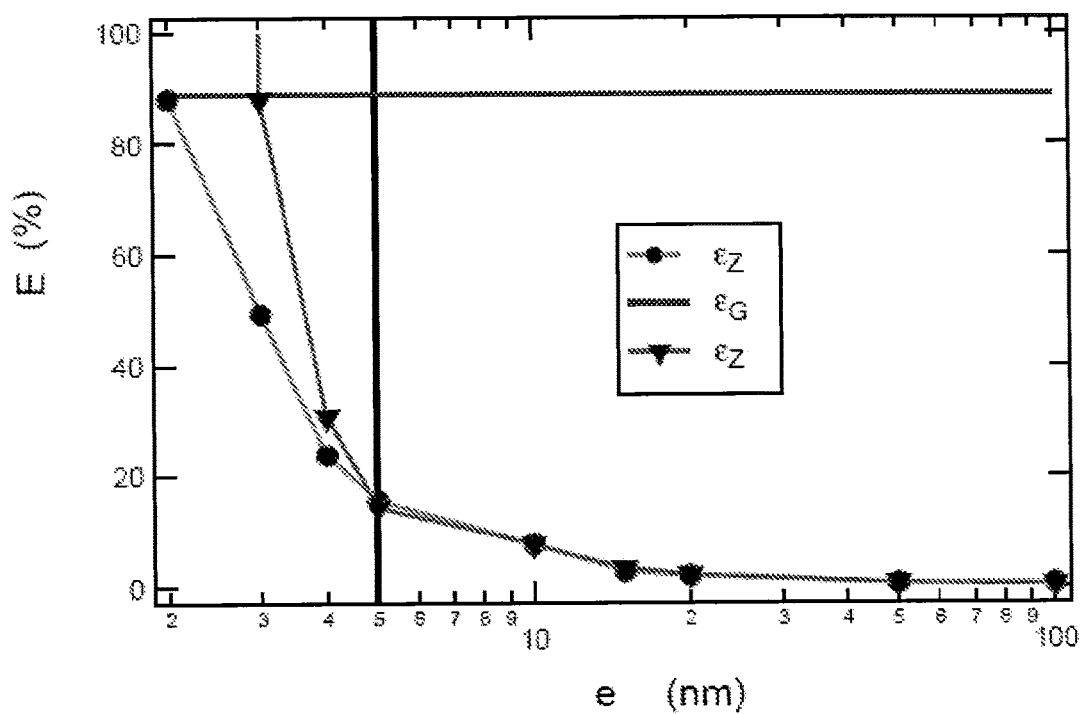
Figure 7:
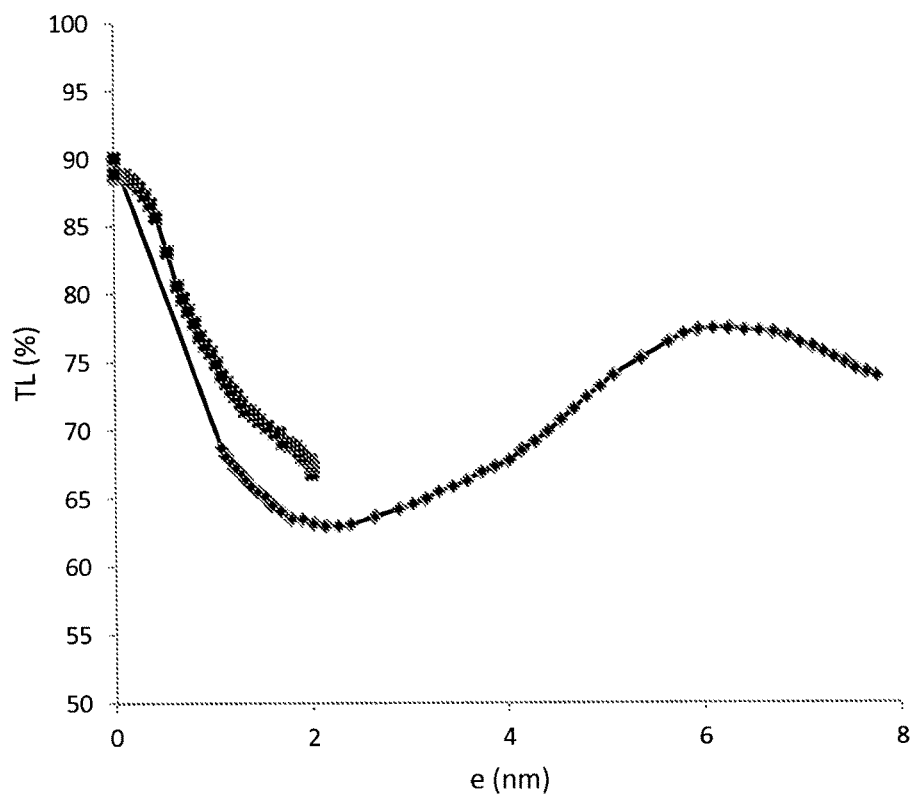
Figure 8:
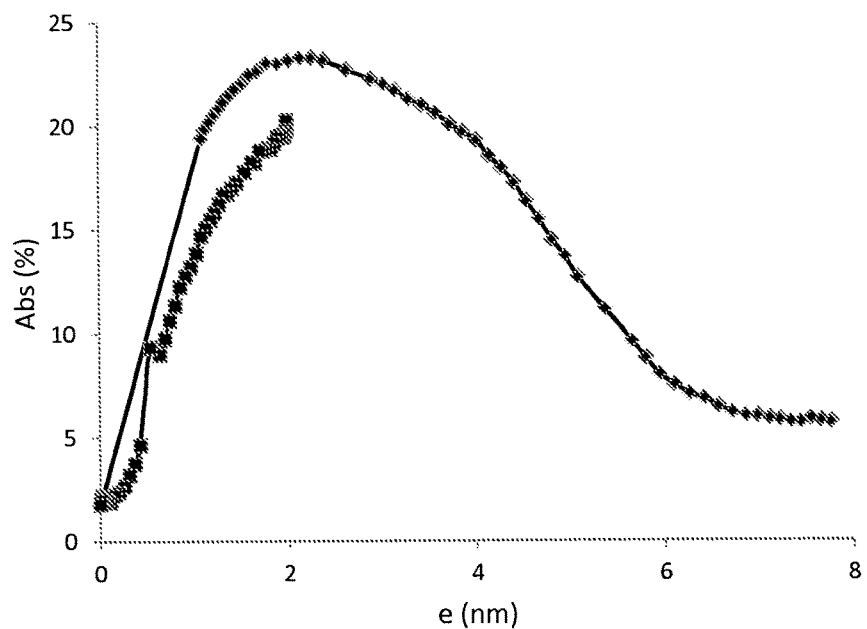
Figure 9:
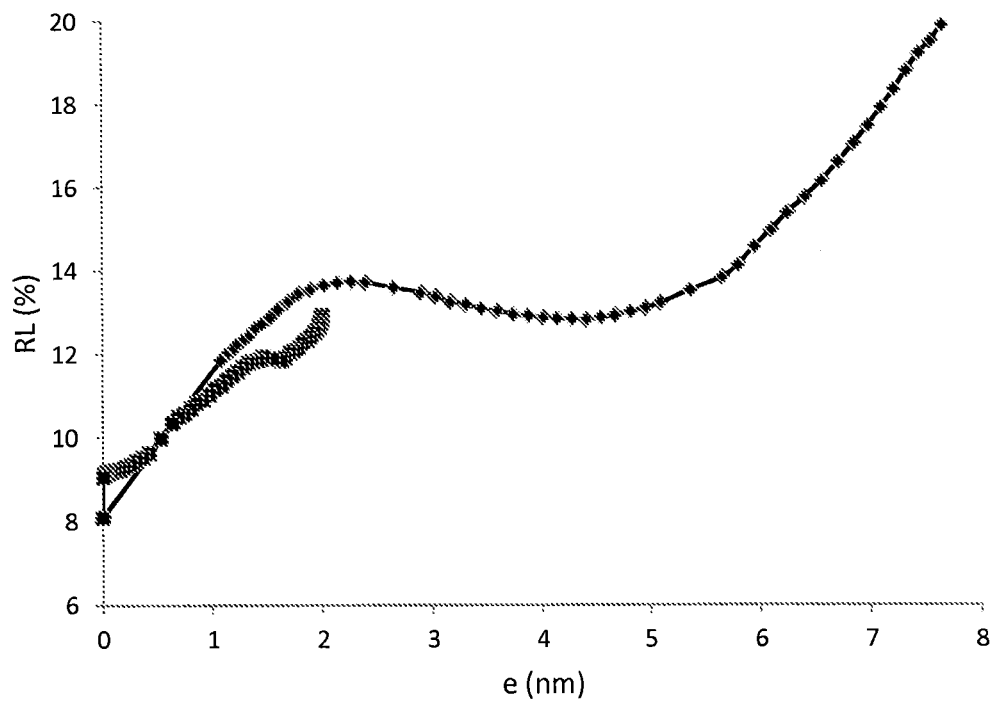
Figure 10:
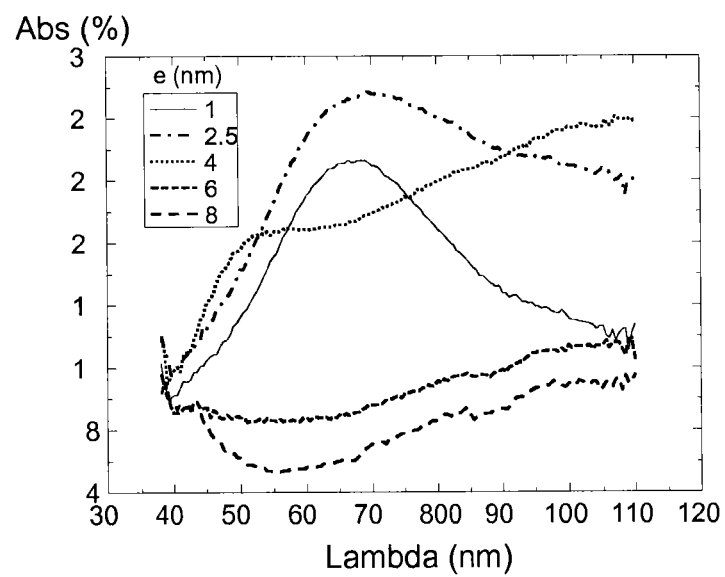
Figure 11:
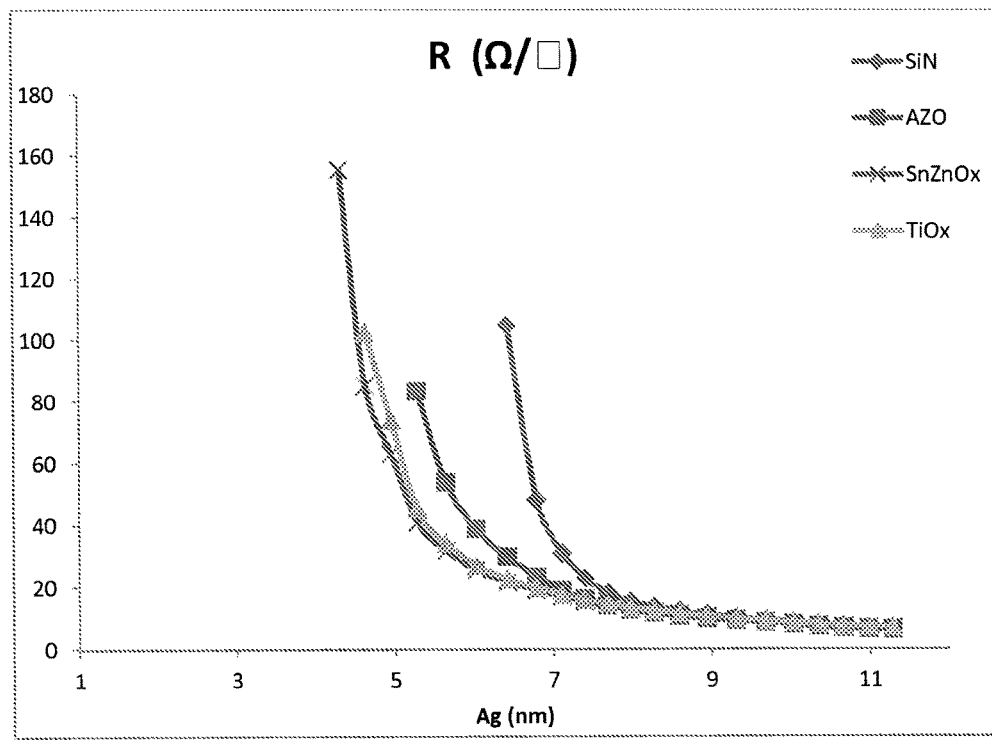
Figure 12:
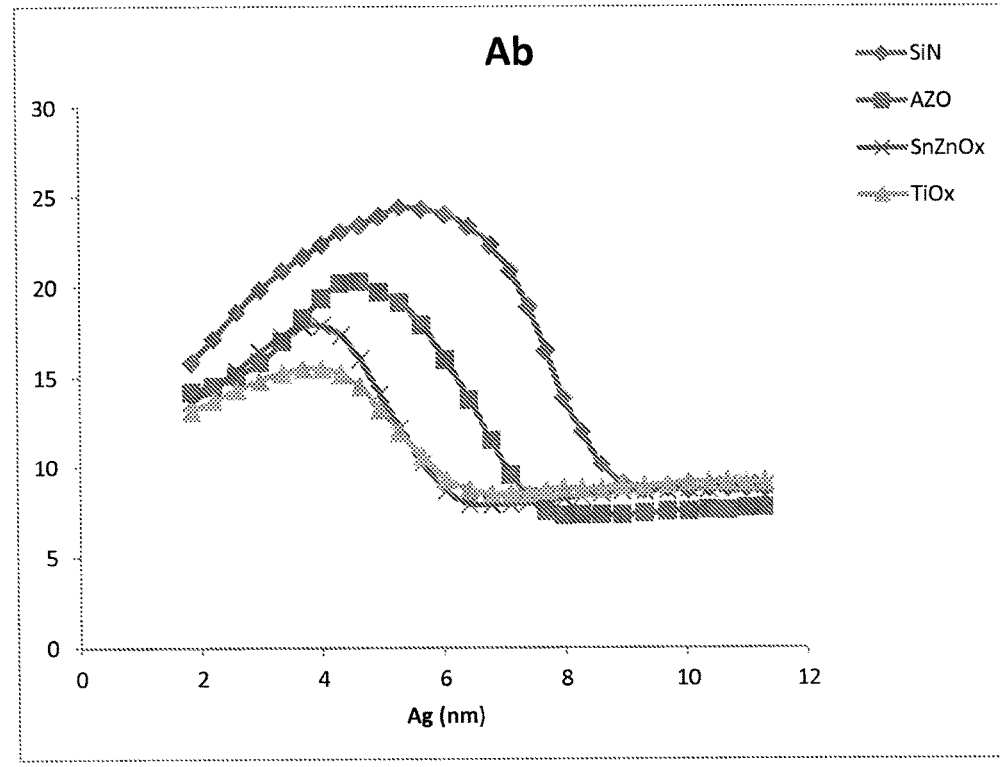
Figure 13:
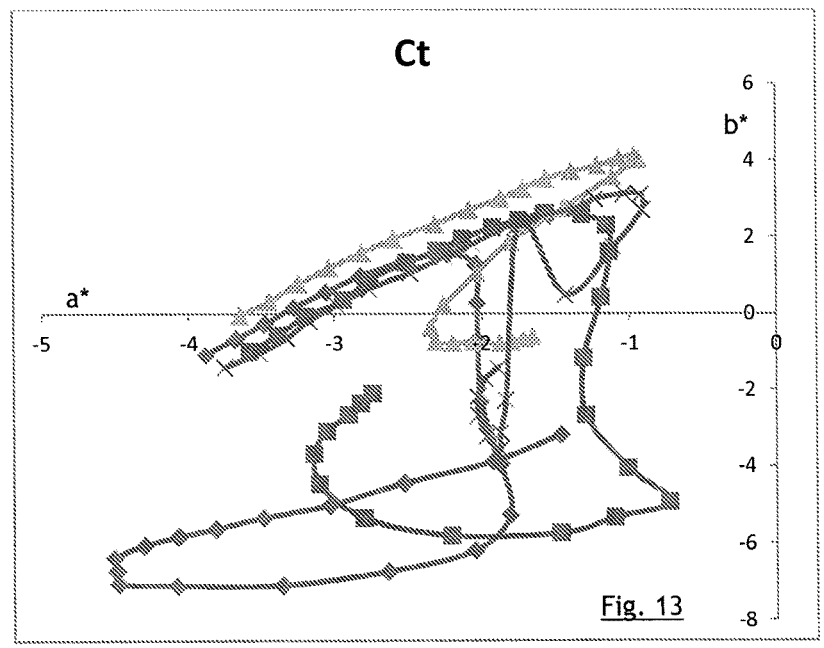
Figure 14:
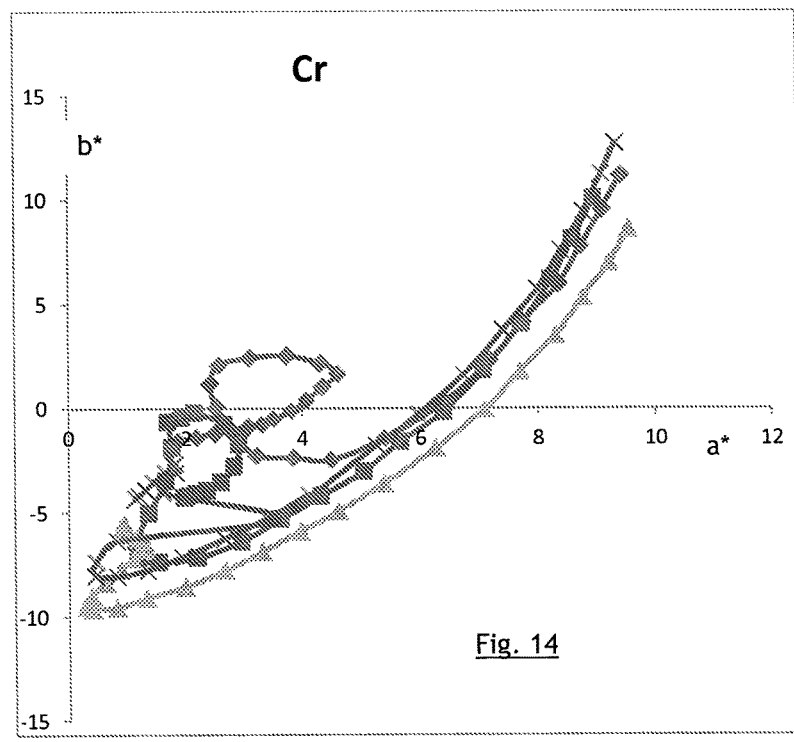
Figure 15:
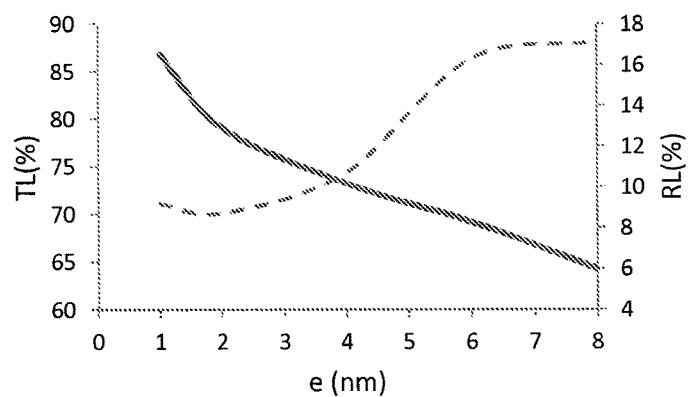
Figure 16:
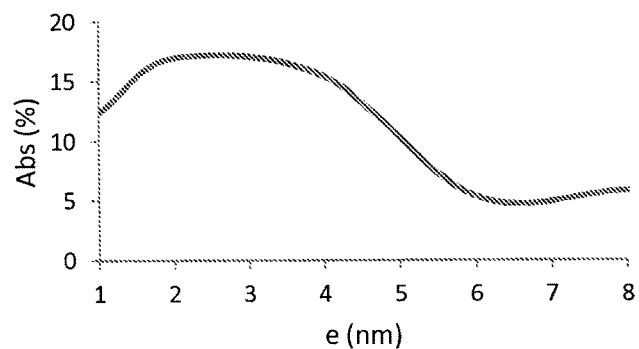
Figure 17:
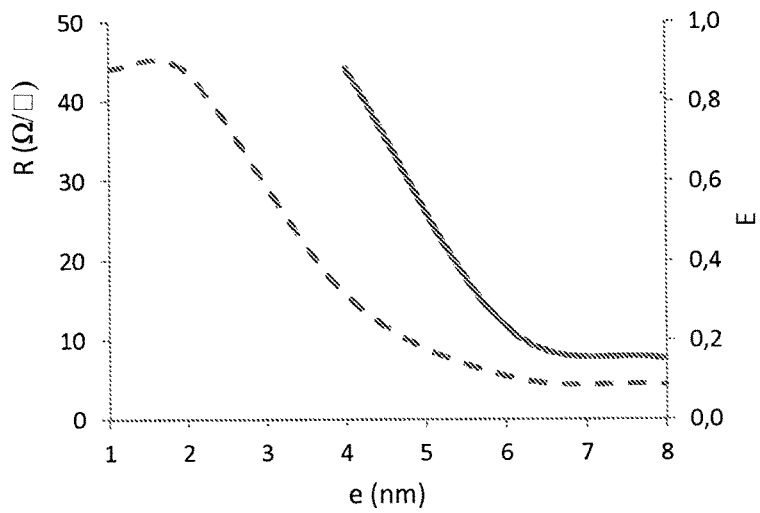
Figure 18:
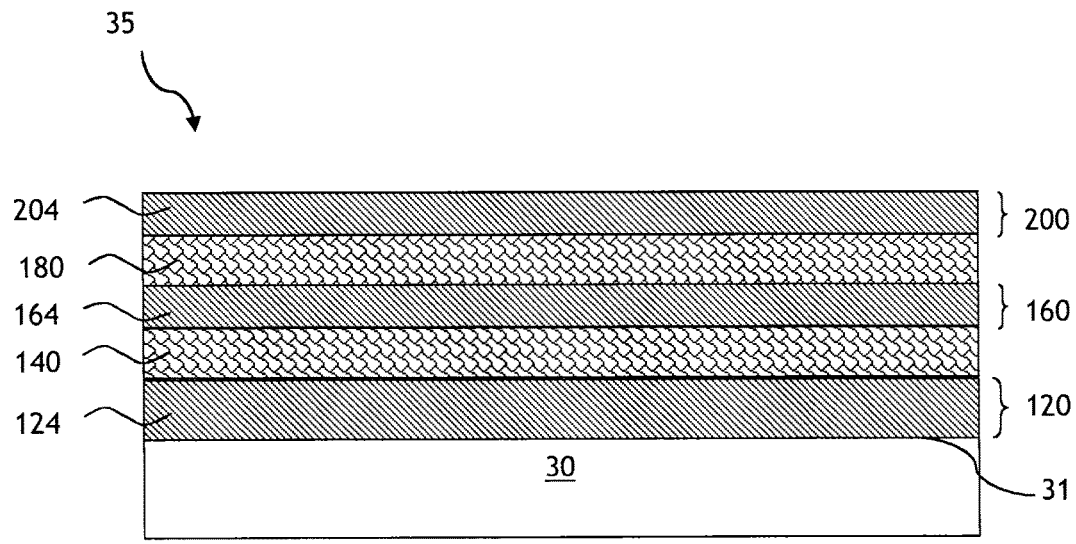
Figure 19:
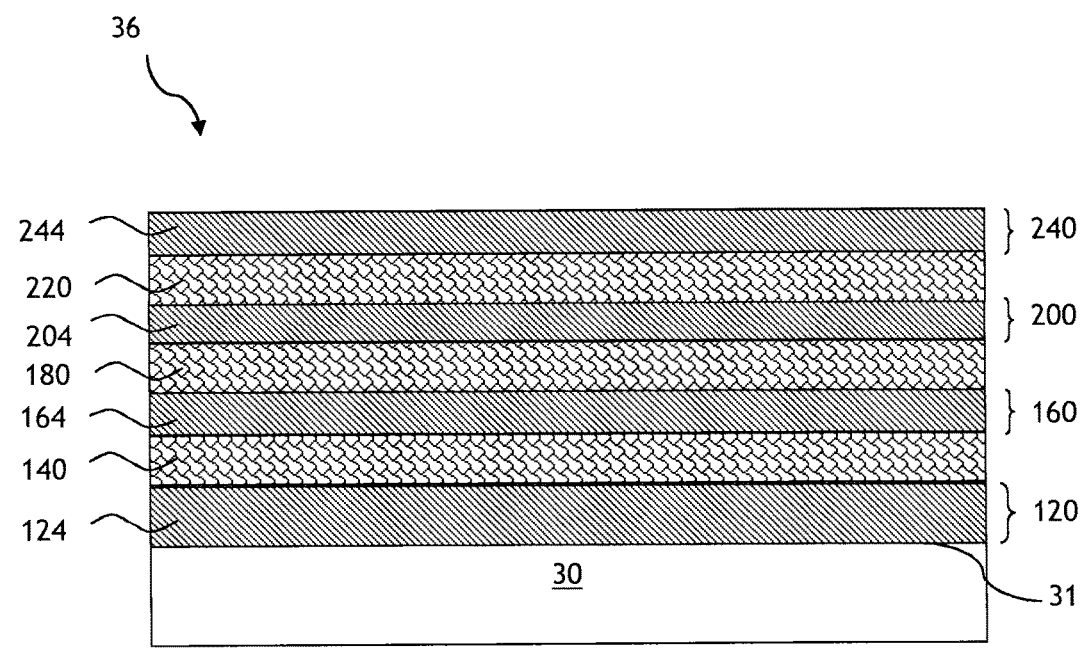

The details and advantageous features of the invention will become apparent from the following non-limiting examples, illustrated with the aid of the appended figures illustrating:

in FIG. 1, a multilayer with a single functional layer according to the invention, the discontinuous functional layer being deposited directly onto a barrier undercoat and directly under a barrier overcoat;

in FIG. 2, a double glazing solution incorporating a multilayer with a single functional layer according to FIG. 1;

in FIG. 3, binary TEM images, from left to right, for a functional layer of silver having a surface area occupation factor of 53% to 98%;

in FIG. 4, the adhesion energy Ad, in J/m², measured for the four discontinuous layer cases in FIG. 3 and compared with the theoretical value, Gm, according to the models, for these same four cases, as a function of the fraction of silver surface ("Silver Surface Fraction" or SSF) in other words the surface area occupation factor;

in FIG. 5, the light transmission in the visible $T_L$, using black triangles, and the light reflection in the visible $R_L$, using black rectangles, of a multilayer of thin films of the Z type as a function of the thickness e of the layer of silver;

in FIG. 6, the theoretical emissivity, using inverted black triangles, and the measured emissivity, using black dots, of a multilayer of thin films of the Z type as a function of the thickness e of the layer of silver together with that of the substrate alone, without a multilayer;

in FIG. 7, the light transmission in the visible $T_L$, using black diamonds, of a multilayer of thin films of the Y type as a function of the thickness e of the layer of silver for a gradient going from 1.0 to 8.0 nm and using black squares for a multilayer of thin films of the Y type as a function of the thickness e of the layer of silver for a gradient going from 0.0 to 2.0 nm;

in FIG. 8, the light absorption in the infrared Abs, using black diamonds, of a multilayer of thin films of the Y type as a function of the thickness e of the layer of silver for a gradient going from 1.0 to 8.0 nm and using black squares for a multilayer of thin films of the Y type as a function of the thickness e of the layer of silver for a gradient going from 0.0 to 2.0 nm;

in FIG. 9, the light reflection in the visible $R_L$, using black diamonds, of a multilayer of thin films of the Y type as a function of the thickness e of the layer of silver for a gradient going from 1.0 to 8.0 nm and using black squares for a multilayer of thin films of the Y type as a function of the thickness e of the layer of silver for a gradient going from 0.0 to 2.0 nm;

in FIG. 10, the absorption spectrum of a multilayer of thin films of the Y type as a function of the wavelength Lambda and as a function of the thickness e of the layer of silver;

in FIG. 11, the resistance per square R in ohms per square of the multilayers in the examples 1 to 4 as a function of the thickness of the layer of silver;

in FIG. 12, the infrared absorption Ab of the multilayers in the examples 1 to 4 as a function of the thickness of the layer of silver;

in FIG. 13, the color in transmission Ct in the Lab diagram, for the multilayers in the examples 1 to 4, as a function of the thickness of the layer of silver; and in FIG. 14, the color in reflection Cr in the Lab diagram, on the multilayer side, for the multilayers in the examples 1 to 4, as a function of the thickness of the layer of silver in FIG. 15, the light transmission in the visible $T_L$, as a dashed line, and the light reflection in the visible $R_L$, as a solid line, for the example 6, as a function of the thickness e of the layer of silver;

in FIG. 16, the absorption in the infrared for the example 6 as a function of the thickness e of the layer of silver;

in FIG. 17, the emissivity, as a dashed line, and the resistance per square, as a solid line, for the example 6, as a function of the thickness e of the layer of silver;

in FIG. 18, a multilayer with two functional layers according to the invention, each of the two discontinuous functional layers being deposited directly onto an antireflective coating and directly under an antireflective coating; and in FIG. 19, a multilayer with three functional layers according to the invention, each of the three discontinuous functional layers being deposited directly onto an antireflective coating and directly under an antireflective coating.

In the FIGS. 1, 2, 18 and 19, the proportions between the thicknesses of the various layers or of the various elements are not rigorously adhered to in order to facilitate their reading.

FIG. 1 illustrates a structure of a multilayer 34 with a single functional layer according to the invention deposited on a transparent glass substrate 30, and more precisely on a face 31 of this substrate 30, in which the single functional layer 140, based on silver or on metal alloy containing silver and preferably made only of silver, is disposed between two antireflective coatings, the underlying antireflective coating 120 situated underneath the functional layer 140 in the direction of the substrate 30 and the overlying antireflective coating 160 disposed on top of the functional layer 140 on the opposite side from the substrate 30.

These two antireflective coatings 120, 160, comprise each at least one antireflective layer 124, 164.

Potentially, on the one hand, the functional layer 140 can be deposited directly onto a barrier undercoat 130 disposed between the underlying antireflective coating 120 and the functional layer 140 and, on the other hand, the functional layer 140 can be deposited directly under a barrier overcoat 150 disposed between the functional layer 140 and the overlying antireflective coating 160.

The barrier under and/or over layers, although deposited in the form of metals and presented as being metal layers, are in practice oxidized layers because their primary function is to get oxidized in the course of the deposition of the multilayer in order to protect the functional layer.

This antireflective coating 160 may end with an optional protective layer 168, in particular based on oxide, notably substœchiometric in oxygen.

When a multilayer with a single functional layer is used in a multiple glazing unit 100 with a double glazing structure, as illustrated in FIG. 2, this glazing unit comprises two substrates 10, 30 which are held together by a chassis structure 90 and which are separated from each other by a gas separation interface 15.

The glazing unit thus forms a separation between an exterior space ES and an interior space IS.

Owing to its high mechanical resistance, the multilayer according to the invention can be positioned on face 4 (on the interior-most sheet of the building when considering the incident direction of the sunlight entering the building and on its face facing the interior).

FIG. 2 illustrates this positioning (the incident direction of the sunlight entering the building being illustrated by the double arrow) on face 4 of a multilayer 34 of thin films positioned on an external face 31 of the substrate 30 in contact with the exterior space ES, the other face 29 of the substrate 30 being in contact with the gas separation interface 15.

However, it may also be envisioned that, in this double glazing structure, one of the substrates has a laminated structure; however, there is no confusion possible because, in such a structure, there is no gas separation interface.

As a first stage, the studies undertaken related to a multilayer of the Z type, having the structure: Substrate/ZnO/Ag/ZnO with each layer of ZnO having a thickness of 10 nm, then to a multilayer of the Y type, having the structure: Substrate/ZnO/Ag/ZnO with each layer of ZnO having a thickness of 5 nm, then five series of examples have been implemented in order to test various materials for encompassing a discontinuous layer, and lastly, one example of a complete multilayer has been implemented.

For all the multilayers hereinafter, the deposition conditions for the layers are:

| Layer | Target employed | Deposition pressure | Gases |
|---|---|---|---|
| $Si_3N_4$:Al | Si:Al at 92:8% wt | $1.5 \times 10^{-3}$ mbar | Ar/(Ar + $N_2$) at 45% |
| $TiO_x$ | $TiO_2$ | $1.5 \times 10^{-3}$ mbar | Ar/(Ar + $O_2$) at 90% |
| $TiO_2$ | $TiO_2$ | $1.5 \times 10^{-3}$ mbar | Ar/(Ar + $O_2$) at 45% |
| $SnZnO_x$ | SnZn at 60:40% wt | $1.5 \times 10^{-3}$ mbar | Ar/(Ar + $O_2$) at 43% |
| ZnO | ZnO | $1.5 \times 10^{-3}$ mbar | Ar/(Ar + $O_2$) at 83% |
| NiCr | NiCr at 80:20% wt | $2 \times 10^{-3}$ mbar | Ar at 100% |
| Ag | Ag | $8 \times 10^{-3}$ mbar | Ar at 100% |

The deposited layers may thus be classified into three categories:
i—layers of dielectric/antireflective material, exhibiting a ratio n/k over the whole visible wavelength range greater than 5: $Si_3N_4$:Al, $TiO_x$, $TiO_2$, ZnO, $SnZnO_x$
ii—metal functional layers of material with reflective properties in the infrared and/or for solar radiation: Ag
iii—barrier under- and overlayers designed to protect the functional layer against a modification of its nature during the deposition of the multilayer: Ni, NiCr; their influence on the optical and energetic properties is generally ignored when their thickness is insignificant (equal to or less than 2 nm).

In all the examples, the multilayer of thin films has been deposited on a substrate made of clear soda-lime glass with a thickness of 4 mm of the Planilux brand, distributed by the company SAINT-GOBAIN.

For these multilayers,
R indicates: the resistance per square of the multilayer, in ohms per square;
Ab indicates: the absorption in the infrared range;
$T_L$ indicates: the light transmission in the visible in %, measured according to the illuminant D65 at 2°;
$R_L$ indicates: the light reflection on the glass side (surface of the substrate opposite to that on which the multilayer is deposited) in the visible in %, measured according to the illuminant D65 at 2°;
Ct indicates: the color in transmission a* and b* in the LAB system measured according to the illuminant D65 at 2°;
Cr indicates: the color in reflection a* and b* in the LAB system measured according to the illuminant D65 at 2°, on the coated side of the substrate (face 31).

According to the invention, a metal functional layer 140 is a discontinuous layer which has a surface area occupation factor (proportion of the surface of the layer which is situated just under the functional layer and which is covered by the metal functional layer) in the range between 50% and 98%.

FIG. 3 shows, from left to right:
a surface area occupation factor of 53% obtained with a silver thickness of 2 nm,
a surface area occupation factor of 63% obtained with a silver thickness of 3 nm,
a surface area occupation factor of 84% obtained with a silver thickness of 4 nm,
a surface area occupation factor of 98% obtained with a silver thickness of 5 nm,
obtained for a multilayer Z of thin films having the structure: Substrate/ZnO/Ag/ZnO, each layer of ZnO having a thickness of 10 nm.

In the present document, when reference is made to the thickness e of a discontinuous functional layer, this will not be the thickness measured in the areas covered by the functional layer or an average thickness, but the thickness that would be obtained if the functional layer were continuous.

This value is accessible by considering the speed of deposition of the layer (or more precisely the speed of scanning of the substrate within the deposition chamber for the metal functional layer), the quantity of sputtered material per unit of time, together with the surface area to which the deposition is applied. This thickness is very practical because it allows a direct comparison with the continuous functional layers.

The thickness e is thus the thickness which would be measured if the deposited layer were continuous.

In practice, if, under the same conditions of deposition by magnetron sputtering (very low pressure, target composition, speed of scanning of the substrate, electrical power to the cathode) the thickness of the functional layer is usually 10 nm, it is necessary and sufficient to reduce the speed of scanning of the substrate by half in order to obtain half the thickness of a functional layer, in other words 5 nm.

In this FIG. 3, observations by transmission electron microscopy, TEM, are shown illustrated in binary mode (black-white). On the four sections of this figure, silver is white and the ZnO black.

It has been observed that, for a multilayer Z of this type, the adhesion energy is more or less constant for a thickness of silver greater than 5 nm: this energy is in the range between 1.0 and 1.5 J/m$^2$, which is quite a low value.

FIG. 4 shows the adhesion energy that has been measured, $G_e$ (curve with the black dots), for the multilayer Z, in the four cases hereinabove of a discontinuous metal functional layer 140: this adhesion energy is always greater than the adhesion energy observed for a thickness of silver greater than 5 nm.

Furthermore, this measured binding energy $G_e$ is higher than the theoretical binding energy $G_m$ (curve with the white squares), such as calculated by the models available in the scientific literature.

FIG. 5 shows, using the black triangles, the light transmission $T_L$, of the multilayer of the Z type, as a function of the thickness e of the metal functional layer of silver: this light transmission remains within a useful range from 60 to 80% for a thickness of silver equal to or less than 5 nm, in other words for a surface area occupation factor in the range between 50% and 98%.

FIG. 5 furthermore shows, using the black rectangles, the light reflection $R_L$, of the multilayer of the Z type, as a function of the thickness e of the metal functional layer of silver: this light reflection remains within a useful range of 10 to 20% for a thickness of silver equal to or less than 5 nm, in other words for a surface area occupation factor in the range between 50% and 98%.

FIG. 6 shows, by way of example, the emissivity of a substrate alone, $\in_G$, without coating: this is the horizontal line situated at around 90%.

FIG. 6 shows furthermore that it is possible to measure with the multilayer of the Z type an emissivity $\in_Z$ (black dots) which is lower than that of the substrate alone for a thickness of silver equal to or less than 5 nm, in other words for a surface area occupation factor in the range between 50% and 98%.

Table 1 hereinafter summarizes the emissivities measured for the multilayers of the Z type as a function of the thickness of the layer of silver and of the surface area occupation factor:

TABLE 1

| Layer of silver | Emissivity ϵ (%) | Surface area occupation factor (%) |
|---|---|---|
| 2 nm | 88.7 | 53 |
| 3 nm | 49.3 | 63 |
| 4 nm | 23.9 | 84 |
| 5 nm | 15.7 | 98 |

The theoretical calculations show that, with the multilayer of the Z type, it is possible to obtain an emissivity $\in_Z$ (inverted black triangles) which is lower than that of the substrate alone for a thickness of silver equal to or less than 5 nm, in other words for a surface area occupation factor in the range between 50% and 98%, while being higher than that observed.

Thus, FIGS. 5 and 6 show that it is possible to form a multilayer of the Z type having a relatively low light reflection, a relatively high light transmission and a rather high emissivity, but which may be useful for certain applications even though the adhesion energy is very high, as can be seen in FIG. 4.

In order to try and better understand the phenomena observed on the multilayers of the Z type, a second multilayer, referred to as "of the Y type", has been tested, having the structure: Substrate/ZnO/Ag/ZnO with each layer of ZnO having a thickness of 5 nm and, for this multilayer of the Y type, silver gradients, on the one hand, between 1.0 and 8.0 nm and, on the other, between 0 and 2.0 nm have been tested.

It has been observed that the absorption increases monotonically between 0 and 2.0 nm going from 2% (absorption of the naked glass) to an absorption in the range between 20 and 23%. As previously, the absorption subsequently decreases rapidly between 2 and 6 nm of silver to reach the values of 5-6%. It is also interesting to note that a part of the level of absorption is associated with an increasing level of reflectivity for the small thicknesses of Ag. This implies that it would be possible to slightly modulate the level of absorption by adjusting the optical interference effects.

Furthermore, it has been observed that, between 0 and around 2 nm, the tint of the multilayer of the Y type becomes more and more blue with (referring to the LAB system) a very strong decrease in the b*. Between around 2 and around 4 nm, the behavior is drastically modified going into the red with a strong increase in the a* and in the b*. Finally, between around 4 and around 8 nm, the colors revert back toward the blue/neutral. One interpretation of this behavior may be given by looking at the variation of the absorption spectrum as a function of the thickness of silver, in FIG. 10:

- at very low thicknesses of silver (1.0 and 2.5 nm), the absorption spectrum exhibits a peak whose position is displaced toward the red by increasing the thickness of Ag, going from 675 nm for 1 nm to 695 for 2.5 nm; this peak doubtless corresponds to the surface plasmons of the "nano-objects" of Ag;
- from 2.5 nm to 4.0 nm, the position of the absorption peak is displaced toward the blue going from 695 nm to 535 nm greatly losing in intensity; in parallel, the level of absorption in the red/near-IR remains high; this range of thickness corresponds to a discontinuous layer of silver with a surface area occupation factor in the range between 50% and 83%;
- finally, from 6.0 to 8.0 nm, the level of absorption decreases strongly with a correspondingly higher reflection: this corresponds to the range of thickness for which the layer of silver is continuous.

The resistance per square of the multilayers of the Y type has been measured locally. For this type of multilayer, it has been possible to measure resistances per square starting from 3.0 nm, indicating the onset of percolation of the Ag film.

Five series of examples have been implemented, numbered 1 to 5, for testing various thicknesses of functional layer as a function of the nature of the layer chosen to be directly underneath in the direction of the substrate (referred to as "wetting layer" 128) and various parameters have been measured for each exemplary series.

For these examples, the two antireflective coatings 120, 160 each comprise an antireflective layer 124, 164.

Table 2 hereinafter illustrates the geometrical or physical thicknesses (rather than the optical thicknesses) in nanometers for each of the layers in the examples 1 to 5:

TABLE 2

| Layer | Ex. 1 | Ex. 2 | Ex. 3 | Ex. 4 | Ex. 5 |
|---|---|---|---|---|---|
| 164 | ZnO | ZnO | ZnO | ZnO | ZnO |
|  | 20 nm | 20 nm | 20 nm | 20 nm | 20 nm |
| 140 | Ag | Ag | Ag | Ag | Ag |
|  | 1-12 nm | 1-12 nm | 1-12 nm | 1-12 nm | 1-12 nm |
| 128 | TiO$_x$ | SnZnO$_x$ | ZnO | Si$_3$N$_4$:Al | NiCr |
|  | 5 nm | 5 nm | 5 nm | 5 nm | 2 nm |
| 124 | Si$_3$N$_4$:Al | Si$_3$N$_4$:Al | Si$_3$N$_4$:Al | Si$_3$N$_4$:Al | Si$_3$N$_4$:Al |
|  | 20 nm | 20 nm | 20 nm | 20 nm | 20 nm |

The antireflective layer 124 in all the examples and the wetting layer 128 in the example 4 are based on silicon nitride and more precisely are made of Si$_3$N$_4$:Al (written "SiN" in FIGS. 11 to 14); they are deposited from a metal target of silicon doped with 8% by weight of aluminum.

The antireflective layer 164 in all the examples and the wetting layer 128 in the example 3 are based on zinc oxide and more precisely are made of ZnO (written "AZO" in FIGS. 11 to 14); they are deposited from a ceramic target composed of zinc oxide ZnO; however, it is possible to use for example a metal target and to perform a reactive sputtering in the presence of oxygen.

Table 3 hereinafter summarizes the maximum thicknesses for the functional layer of silver which allowed a discontinuous functional layer to be formed, as a function of the nature of the layer situated just above:

TABLE 3

| Layer 128 | Thickness e for the layer 140 | Thickness e preferred for the layer 140 | Thickness e most preferred for the layer 140 |
|---|---|---|---|
| Ex. 1: $TiO_x$ | $1.8 \leq e \leq 5.0$ nm | $1.8 \leq e \leq 5.0$ nm | $1.8 \leq e \leq 4.5$ nm |
| Ex. 2: $SnZnO_x$ | $1.8 \leq e \leq 4.5$ nm | $1.8 \leq e \leq 4.5$ nm | $1.8 \leq e \leq 4.0$ nm |
| Ex. 3: ZnO | $1.8 \leq e \leq 5.0$ nm | $1.8 \leq e \leq 5.0$ nm | $1.8 \leq e \leq 4.5$ nm |
| Ex. 4: $Si_3N_4$:Al | $1.8 \leq e \leq 7.0$ nm | $1.8 \leq e \leq 7.0$ nm | $1.8 \leq e \leq 5.0$ nm |
| Ex. 5: NiCr | $1.8 \leq e \leq 5.0$ nm | $1.8 \leq e \leq 5.0$ nm | $1.8 \leq e \leq 4.0$ nm |

It has been observed that quite high light transmissions $T_L$ (higher than 50%) and quite low light reflections $T_L$ (equal to or lower than 20%) could be obtained:

TABLE 4

| Layer 128 | Thickness e for the layer 140 | Thickness e preferred for the layer 140 | Thickness e most preferred for the layer 140 |
|---|---|---|---|
| Ex. 1: $TiO_x$ | $68.4 \leq T_L \leq 73.1$ | $68.4 \leq T_L \leq 71.2$ | $68.4 \leq T_L \leq 69$ |
|  | $13.7 \leq R_L \leq 18.4$ | $14.3 \leq R_L \leq 18.4$ | $15.5 \leq R_L \leq 18.4$ |
| Ex. 2: $SnZnO_x$ | $66.2 \leq T_L \leq 69.9$ | $66.2 \leq T_L \leq 68.7$ | $66.2 \leq T_L \leq 68.7$ |
|  | $14.1 \leq R_L \leq 17.6$ | $15.0 \leq R_L \leq 17.6$ | $15.6 \leq R_L \leq 17.6$ |
| Ex. 3: ZnO | $64.1 \leq T_L \leq 68.1$ | $63.1 \leq T_L \leq 68.1$ | $63.1 \leq T_L \leq 68.1$ |
|  | $16.2 \leq R_L \leq 17.7$ | $16.6 \leq R_L \leq 17.7$ | $16.6 \leq R_L \leq 17.7$ |
| Ex. 4: $Si_3N_4$:Al | $59.4 \leq T_L \leq 64.1$ | $59.4 \leq T_L \leq 64.1$ | $59.4 \leq T_L \leq 64.1$ |
|  | $13.6 \leq R_L \leq 20.0$ | $14.4 \leq R_L \leq 20.0$ | $15.6 \leq R_L \leq 20.0$ |

It has been furthermore observed that:

- the resistance per square R of the multilayers could take reasonable values (less than 200Ω per square), as can be seen in FIG. 11,
- the absorption could be relatively low (less than or equal to 25%), as can be seen in FIG. 12,
- the color in transmission Ct could be in the blue-green (a* negative or slightly positive), as can be seen in FIG. 13, and
- the color in reflection Cr could be in the blue-green (a* negative or slightly positive), as can be seen in FIG. 14.

The colors, both in transmission and in reflection, have not been optimized for the tests, but the rules for optimization as a function of the thicknesses of the antireflective layers appear to be the same as for the multilayers with complete (or continuous) metal functional layers.

In order to confirm these observations, one exemplary series has been implemented on the basis of the example 6 having the structure and the following geometrical or physical thicknesses in nanometers (rather than the optical thicknesses), with reference to FIG. 1:

TABLE 5

| Layer | Material | Ex. 6 |
|---|---|---|
| 164 | $Si_3N_4$:Al | 40 |
| 162 | ZnO:Al | 5 |
| 140 | Ag | 1 to 8 |
| 128 | ZnO:Al | 10 |
| 124 | $Si_3N_4$:Al | 15 |

This example 6 has a typical low-emissive dip-coatable multilayer structure, being based on the example 3 which comprises a wetting layer of ZnO under the functional layer, and following the teaching of the European patent application No EP 718 250, in other words, by providing a barrier layer of silicon nitride on either side of the assembly ZnO/Ag.

The first test performed is the HH (High Humidity) test. This consists in putting into a climatic chamber the samples for the desired duration (7 days, 14 days and 56 days) and removing it without switching off the chamber in order to observe it. For the thicknesses 1, 2, 3, 4 and 5 nm of Ag, very few defects appear and with little variation over time, in contrast to 6, 7 and 8 nm where corrosion appears after 7 days of testing and then continues to progress.

It has been observed that the smaller the thicknesses of silver, the better the multilayer resists the mechanical resistance test EST, such as is habitually practiced. For the thicknesses of Ag of 1 and 2 nm, the first scratch appears at 7 N, compared with 8 nm of Ag where its appearance occurs from 0.3 N. These results are coherent with the increase in the adhesion energy observed during the first tests.

After annealing at 650° C. for 10 min (for the tests ESTTT) simulating a forming or dip-coating heat treatment, the observations remain similar. For smaller thicknesses of Ag, the scratches appear more quickly. For the thicknesses of Ag of 1 and 2 nm, the first scratch is seen at 3 N, compared with 8 nm of Ag, where its appearance is seen from 0.1 N.

In order to evaluate the optical "performances" of the series of examples 6, the light transmission in the visible and the light reflection in the visible as a function of the thickness of silver are indicated in FIG. 15, the light absorption as a function of the thickness of silver is indicated in FIG. 16 and the resistance per square as a function of the thickness of silver in FIG. 17.

The light absorption increases between 1 and 3 nm of silver up to relatively high values (of around 16 to 18%), then decreases after 3 nm to attain values close to the "usual" values of conventional low-emission multilayers with a continuous silver layer with a thickness of 6 to 8 nm. The decrease in the absorption after 3 nm is concomitant with the increase in light reflection.

It has been observed that, starting from 3 nm, it is possible to measure resistances per square below 100 ohms/square. The curve of resistance per square as a function of the absorption shows a rapid increase in the absorption for resistances per square in the range between 5 and 40 ohms/square. This absorption subsequently stabilizes around the maximum value of around 20%.

Furthermore, it has been noticed that at lower thicknesses of Ag (1 to 4 nm), the color in transmission is situated in the blue.

FIGS. 18 and 19 respectively illustrate a structure of a multilayer 35 with two functional layers according to the invention and a structure of a multilayer 36 with three functional layers according to the invention, deposited on a transparent glass substrate 30, and more precisely on a face 31 of this substrate 30.

Each functional layer 140, 180, 220, based on silver or on a metal alloy containing silver and preferably only silver, is disposed between two antireflective coatings, an underlying antireflective coating 120, 160, 200 situated underneath each functional layer 140, 180, 220 in the direction of the substrate 30 and an overlying antireflective coating 160, 200, 240 disposed on top of each functional layer 140, 180, 220 on the opposite side from the substrate 30.

Each antireflective coating 120, 160, 200, 240 comprises at least one antireflective layer 124, 164, 204, 244.

In order to explore the application of the discovery in relation to the high adhesion energy of the metal functional layers based on silver or made of silver which are discontinuous, according to the invention, three examples have been implemented, having the following structure and the geometrical or physical thicknesses in nanometers (rather than the optical thicknesses), with reference to FIGS. 1, 18 and 19:

TABLE 6

| Layer | Material | Ex. 7 | Ex. 8 | Ex. 9 |
|---|---|---|---|---|
| 244 | TiO$_2$ | | | 28 |
| 220 | Ag | | | 4.5 |
| 204 | TiO$_2$ | | 20 | 20 |
| 180 | Ag | | 4.5 | 4.5 |
| 164 | TiO$_2$ | 11 | 56 | 55 |
| 140 | Ag | 4.5 | 4.5 | 4.5 |
| 124 | TiO$_2$ | 10 | 11.7 | 20 |

The deposited antireflective layers 124, 164, 204 and 244 of titanium dioxide TiO$_2$ have an optical index (at 550 nm) of 2.4.

These multilayers have been deposited on a substrate of clear glass with a thickness of 4 mm.

It has been observed that these examples 7 to 9 also exhibit an increase in the adhesion energy with respect to the theoretical adhesion energy.

The following table presents the main optical characteristics of the examples 7 to 9 and compares these characteristics with those of a multilayer (ex. 10) for solar control by absorption, comprising a single nitrided functional layer of NbN with a thickness of 1.5 nm, sandwiched above in the direction of the glass substrate with a thickness of 4 mm by a layer based on silicon nitride with a thickness of 10 nm, and below by a layer based on silicon nitride with a thickness of 30 nm.

TABLE 7

| | Ex. 7 | Ex. 8 | Ex. 9 | Ex. 10 |
|---|---|---|---|---|
| g | 64 | 54.8 | 49.9 | 69.1 |
| R (ohms/square) | 40 | 20 | 13.5 | |
| T$_L$ | 70 | 61.5 | 55.2 | 66.6 |
| Ct - a* | −3.5 | −4 | −1.6 | −0.7 |
| Ct -b* | 2.7 | 0 | −1.24 | 3 |
| R$_L$ | 15 | 14.9 | 11.95 | 19.1 |
| Cr -a* | 2.3 | −0.3 | −12 | −1 |
| Cr -b* | −15 | −15.5 | −20 | −4 |
| s | 1.09 | 1.12 | 1.11 | 0.96 |

It has thus been observed that it is possible to form:
a multilayer with a single metal functional layer being discontinuous (ex. 7),
a multilayer with two metal functional layers with two discontinuous functional layers (ex. 8),
a multilayer with three metal functional layers with three discontinuous functional layers (ex. 9),
which exhibit an average light transmission in the visible (between 50% and 70%) and which is within the same range as that of the example 10, together with an average selectivity s (of around 1.1) and which is within the same range as that of the example 10.

Furthermore, the colors obtained, both in transmission (Ct) and in reflection (Cr), are within the desired ranges: blue, blue-green.

The present invention is presented in the preceding description by way of example. It will be understood that those skilled in the art are capable of implementing different variants of the invention without however straying from the framework of the patent such as defined by the claims.

The invention claimed is:

1. A substrate comprising, on a face of the substrate, a multilayer of thin films comprising, in the following order from the face of the substrate:
   a first antireflective coating comprising an antireflective layer;
   a first metal functional layer comprising silver, wherein the first metal functional layer is a discontinuous layer having a surface area occupation factor in the range of 53% to 98% and is in the form of interconnected islands with uncovered regions between the islands; and
   a second antireflective coating comprising an antireflective layer.

2. The substrate of claim 1, wherein the first metal functional layer has a thickness e:
   1.0≤e ≤4.5 nm, which is deposited on a layer comprising titanium dioxide TiO$_2$; or
   1.0≤e ≤4.5 nm, which is deposited on a layer comprising zinc and tin oxide SnZnO$_x$;or
   1.0≤e ≤5.0 nm, which is deposited on a layer comprising zinc oxide ZnO; or
   1.0≤e ≤7.0 nm, which is deposited on a layer comprising silicon nitride Si$_3$N$_4$; or
   1.0≤e ≤5.0 nm, which is deposited on a layer comprising nickel.

3. The substrate of claim 1, wherein the first antireflective coating comprises a medium index antireflective layer comprising a material having a refractive index in the range of from 1.8 to 2.2 at 550 nm.

4. The substrate of claim 1, wherein the first antireflective coating comprises a high index antireflective layer comprising a material having a refractive index in the range of from 2.3 to 2.7 at 550 mu.

5. The substrate of claim 1, wherein the second antireflective coating comprises a medium index antireflective layer comprising a material having a refractive index in the range of from 1.8 to 2.2 at 550 nm.

6. The substrate of claim 1, wherein the second antireflective coating comprises a high index antireflective layer comprising a material having a refractive index in the range of from 2.3 to 2.7 at 550 nm.

7. The substrate of claim 1, wherein the multilayer of thin films further comprises a second metal functional layer and a third antireflective coating comprising an antireflective layer such that the multilayer of thin films has the following configuration from the face of the substrate:
   the first antireflective coating;
   the first metallic functional layer;
   the second antireflective coating;
   the second metallic functional layer; and
   the third antireflective coating,
   wherein the second metal functional layer is a discontinuous layer having a surface area occupation factor in the range of 53% to 98% and is in the form of interconnected islands with uncovered regions between the islands.

8. The substrate of claim 7, wherein the multilayer of thin films further comprises a third metal functional layer and a fourth antireflective coating comprising an antireflective layer such that the multilayer of thin films has the following configuration from the face of the substrate:
   the first antireflective coating;
   the first metallic functional layer;
   the second antireflective coating;
   the second metallic functional layer;
   the third antireflective coating;
   the third metallic functional layer; and
   the fourth antireflective coating,
   wherein the third metal functional layer is a discontinuous layer having a surface area occupation factor in the range of 53% to 98% and is in the form of interconnected islands with uncovered regions between the islands.

9. The substrate of claim 1, wherein the multilayer of thin films further comprises a barrier undercoat comprising a thin layer comprising nickel or titanium having a physical thickness e' such that 0.2 nm ≤e'≤2.5 nm,
   wherein the barrier undercoat is in direct contact with the first metallic functional layer and disposed between the first metallic functional layer and the first antireflective coating.

10. The substrate of claim 1, wherein a last layer of the multilayer of thin films, which is furthest from the face of the substrate, comprises an oxide comprising titanium dioxide or a mixed oxide of zinc and tin.

11. A multiple glazing unit, comprising at least two substrates which are held together by a chassis structure, said glazing unit forming a separation between an exterior space and an interior space, in which at least one gas separation interface is disposed between the two substrates, wherein one of the two substrates is the substrate of claim 1.

12. A process, comprising:
   depositing the first metal functional layer, the first antireflective coating, and the second antireflective coating, thereby forming the substrate of claim 1.

13. The substrate of claim 7, wherein the first antireflective coating and the second antireflective coating each comprise a medium index antireflective layer comprising a material having a refractive index in the range of from 1.8 to 2.2 at 550 nm.

14. The substrate of claim 7, wherein the first antireflective coating and the second antireflective coating each comprise a high index antireflective layer comprising a material having a refractive index in the range of from 2.3 to 2.7 at 550 nm.

15. The substrate of claim 7, wherein the second antireflective coating and the third antireflective coating each comprise a medium index antireflective layer comprising a material having a refractive index in the range of from 1.8 to 2.2 at 550 nm.

16. The substrate of claim 7, wherein the second antireflective coating and the third antireflective coating each comprise a high index antireflective layer comprising a material having a refractive index in the range of from 2.3 to 2.7 at 550 nm.

17. The substrate of claim 1, wherein the multilayer of thin films further comprises a barrier overcoat comprising a thin layer comprising nickel or titanium having a physical thickness e' such that 0.2 nm ≤e'≤2.5 nm,
   wherein the barrier overcoat is in direct contact with the first metallic functional layer and disposed between the first metallic functional layer and the second antireflective coating.

18. The substrate of claim 1, where the first metallic layer has a surface area occupation factor in the range of 53-83%.

19. The substrate of claim 7, wherein the first metallic functional layer and the second metal functional layer each have a surface area occupation factor in the range of 53-83%.

20. The substrate of claim 8, wherein the first metallic functional layer, the second metal functional layer, and the third metallic functional layer each have a surface area occupation factor in the range of 53-83%.

* * * * *